United States Patent Office.

JOSEPH H. DENIGER, OF BRIDGEPORT, CONNECTICUT.

*Letters Patent No.* 88,142, *dated March* 23, 1869; *reissue No*, 3,511, *dated June* 22, 1869.

IMPROVEMENT IN TEMPERING STEEL SPRINGS.

The Schedule referred to in these Letters Patent and making part of the same.

*To all whom it may concern:*

Be it known that I, JOSEPH H. DENIGER, of Bridgeport, in the county of Fairfield, and State of Connecticut, have invented a new Improvement in Tempering Steel Springs; and I do hereby declare the following to be a full, clear, and exact description of the same.

For first hardening the steel spring, I prepare a compound bath, composed of the following ingredients or substances, and substantially in the following proportions:

In one barrel of animal, vegetable, or mineral oil, (by practical test preferring linseed or whale-oil,) I put thirty pounds of tallow, and from one to one and a half gallon of spirits of turpentine, and mix them well.

For use, I place this bath near the forge, or tempering-fire, so that when I have heated the steel spring to the proper degree or temperature, I can remove it to and immerse it in the bath, with the least exposure to the atmosphere, and after the steel has been sufficiently cooled in the bath, without exposure to the air, I return it to the fire, and heat it to such a degree of temperature, that while thus heated the shape of the spring may be properly corrected or adjusted, when the proposed spring-temper will be attained.

If I am not ready to shape the spring immediately after cooling it, I allow it to remain in the bath until I am ready, so as not to expose it to the air for any length of time, from the time it is first heated until the tempering is complete and the spring is properly shaped, when, if there is too much heat remaining, it may be again immersed in the bath, to completely cool it, before being generally exposed to the atmospheric air.

When springs are tempered by the common process, the steel is very liable to crack, and many times ten per cent. of the springs is unfit for use, whereas, by my process of using the before-described bath, and by preventing the exposure of the steel to the air during the process, much, if not all, of this loss will be prevented, and thereby a very great saving will be effected in the manufacture of springs.

What I claim as my invention, and desire to secure by Letters Patent, is—

The mode, method, or process herein described, of tempering steel springs for railroad-cars, carriages, &c.

JOSEPH H. DENIGER.

Witnesses:

H. T. BLAKE,

JOHN GARDNER.